United States Patent
Waskie et al.

(10) Patent No.: US 9,139,236 B2
(45) Date of Patent: Sep. 22, 2015

(54) MULTI-POSITION ENDGATE SYSTEM

(71) Applicant: GM GLOBAL TECHNOLOGY OPERATIONS LLC, Detroit, MI (US)

(72) Inventors: David B. Waskie, Harrison Township, MI (US); Bradley E. Shoen, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/268,542

(22) Filed: May 2, 2014

(65) Prior Publication Data

US 2015/0115644 A1    Apr. 30, 2015

Related U.S. Application Data

(60) Provisional application No. 61/895,675, filed on Oct. 25, 2013.

(51) Int. Cl.
*B62D 33/03*    (2006.01)
*B62D 33/027*   (2006.01)

(52) U.S. Cl.
CPC .................................. *B62D 33/0273* (2013.01)

(58) Field of Classification Search
CPC ..... H04M 2250/02; H04N 1/05; H04R 1/083; H04R 1/1008; H04R 1/1041; B62D 33/0273; A47C 1/0355; A61B 19/5223; E05F 1/123; E05Y 2900/546
USPC .............................. 296/57.1; 16/294; 254/199
See application file for complete search history.

(56) References Cited

U.S. PATENT DOCUMENTS

| | | | | |
|---|---|---|---|---|
| 622,049 A * | 3/1899 | Kissinger | ...................... | 296/57.1 |
| 1,125,982 A * | 1/1915 | Dufala | ........................ | 296/57.1 |
| 2,627,761 A * | 2/1953 | Recker | ........................... | 74/664 |
| 2,742,317 A * | 4/1956 | Wiley | ............................. | 296/51 |
| 2,765,088 A * | 10/1956 | Bull | ................................ | 414/572 |
| 2,784,027 A * | 3/1957 | Temp | ............................ | 296/156 |
| 2,955,863 A * | 10/1960 | Olender | ....................... | 292/264 |
| 3,305,112 A * | 2/1967 | Brown | .......................... | 414/557 |
| 4,135,761 A * | 1/1979 | Ward | ............................ | 296/37.6 |
| 4,585,265 A * | 4/1986 | Mader | ............................. | 296/56 |
| 4,601,485 A * | 7/1986 | Furchak | ....................... | 280/423.1 |
| 4,787,809 A * | 11/1988 | Zrostlik | ......................... | 414/557 |
| 4,944,546 A * | 7/1990 | Keller | ............................. | 296/61 |
| 4,981,320 A * | 1/1991 | Bowman | ....................... | 296/57.1 |
| 5,468,037 A * | 11/1995 | Peterson et al. | ............. | 296/57.1 |
| 5,645,310 A * | 7/1997 | McLaughlin | ............... | 296/180.5 |
| 5,707,095 A * | 1/1998 | Pribak et al. | ................. | 296/57.1 |
| 5,848,818 A * | 12/1998 | Flueckinger | ................ | 296/37.6 |
| 5,857,724 A * | 1/1999 | Jarman | ....................... | 296/26.11 |
| 5,934,727 A | 8/1999 | Storc et al. | | |

(Continued)

*Primary Examiner* — Kiran B Patel
(74) *Attorney, Agent, or Firm* — Quinn Law Group, PLLC

(57) ABSTRACT

An endgate system providing multiple positions or angles of the endgate relative to the cargo box is disclosed. An end piece for attaching a cable to an anchor point includes a fixed link attached to the cable and a rotating link operatively attached to the fixed link. The rotating link is rotatable about a pivot point between a first position and a second position relative to the fixed link. The second position of the rotatable link is more proximal to the cable than the first position. A primary keyway is formed in the rotating link and is configured to selectively mate with the anchor point in the first position. A secondary keyway is formed in the rotating link and is configured to selectively mate with the anchor point in the second position

14 Claims, 6 Drawing Sheets

(56) References Cited

U.S. PATENT DOCUMENTS

| | | | |
|---|---|---|---|
| 6,279,979 B1* | 8/2001 | Cauley | 296/57.1 |
| 6,431,804 B1* | 8/2002 | Wetzig, III | 410/94 |
| 6,450,559 B1 | 9/2002 | Renke | |
| 6,607,232 B2* | 8/2003 | Katulka | 296/57.1 |
| 6,951,358 B1* | 10/2005 | Ousley et al. | 296/57.1 |
| 6,988,756 B1* | 1/2006 | Meinke et al. | 296/50 |
| 7,021,689 B1* | 4/2006 | Weisbeck, III | 296/26.11 |
| 7,073,837 B2* | 7/2006 | Madlinger | 296/57.1 |
| 8,075,038 B2* | 12/2011 | Zielinsky | 296/57.1 |
| 2001/0024046 A1* | 9/2001 | Mizuta | 296/57.1 |
| 2002/0096903 A1* | 7/2002 | Renke | 296/50 |
| 2004/0041429 A1* | 3/2004 | McLaren et al. | 296/57.1 |
| 2010/0052355 A1* | 3/2010 | McGowan et al. | 296/57.1 |
| 2010/0289289 A1* | 11/2010 | Bator et al. | 296/55 |
| 2013/0038081 A1* | 2/2013 | Kerr, III | 296/57.1 |
| 2013/0060403 A1* | 3/2013 | Kerr | 701/2 |
| 2014/0028046 A1* | 1/2014 | Cauley et al. | 296/57.1 |

\* cited by examiner

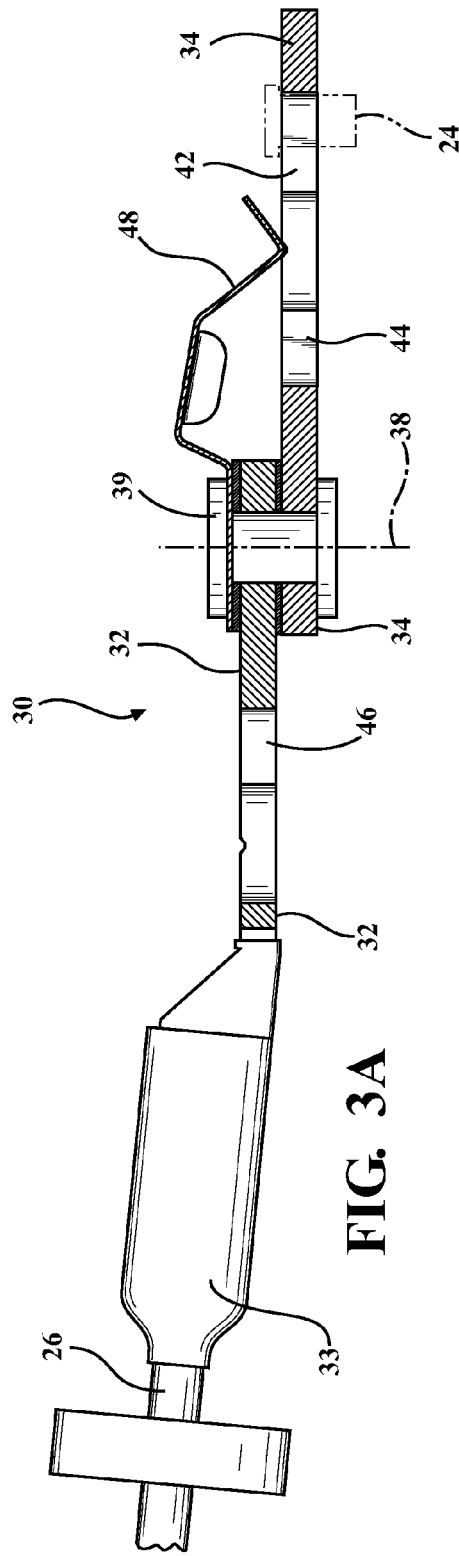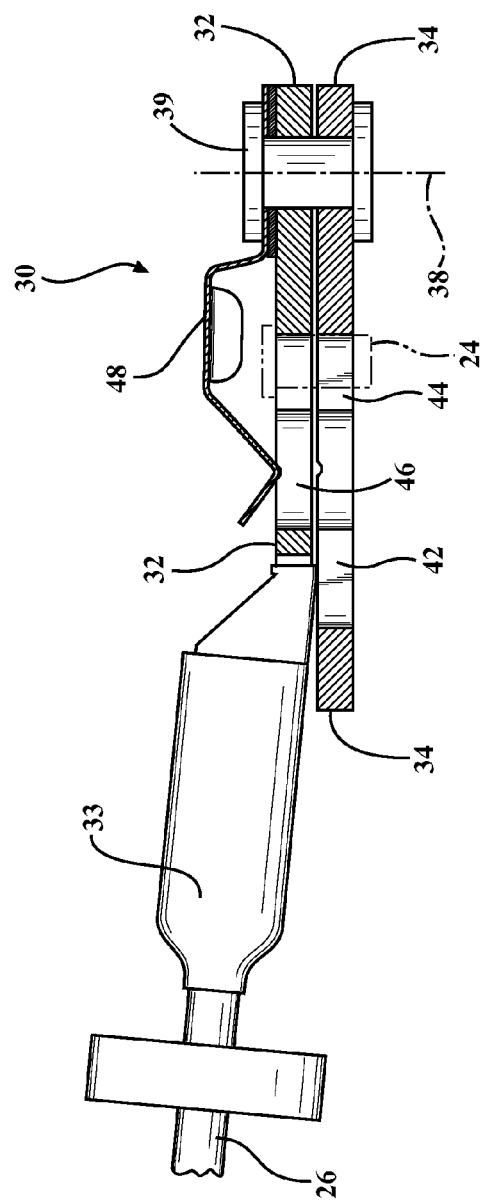

MULTI-POSITION ENDGATE SYSTEM

CROSS-REFERENCE TO RELATED APPLICATIONS

This application claims the benefit of U.S. Provisional Application No. 61/895,675, filed Oct. 25, 2013, which is hereby incorporated by reference in its entirety.

TECHNICAL FIELD

This disclosure relates to openings for cargo compartments, such as endgates or tailgates.

BACKGROUND

Some vehicles with cargo compartments use endgates or tailgates to allow access to an end or side of the cargo compartment. Endgates may be hinged boards or doors that are often found at the rear of the vehicle and can be lowered during loading and unloading.

SUMMARY

An endgate system providing multiple positions or angles of the endgate relative to the cargo box is provided. An end piece for attaching a cable to a boss or anchor point is provided. The end piece includes a fixed link attached to the cable and a rotating link operatively attached to the fixed link.

The rotating link is rotatable about a pivot point between a first position and a second position relative to the fixed link. The second position of the rotatable link is more proximal to the cable than the first position.

A primary keyway is formed in the rotating link and is configured to selectively mate with the boss when the rotating link is in the first position. A secondary keyway is formed in the rotating link and is configured to selectively mate with the boss when the rotating link is in the second position.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 3A is a schematic, cross-sectional or plane-intersectional view of the cable mechanism taken substantially along line 3A-3A of FIG. 2A;

FIG. 3B is a schematic, cross-sectional or plane-intersectional view of the cable mechanism taken substantially along line 3B-3B of FIG. 2B;

DETAILED DESCRIPTION

Figure 1:
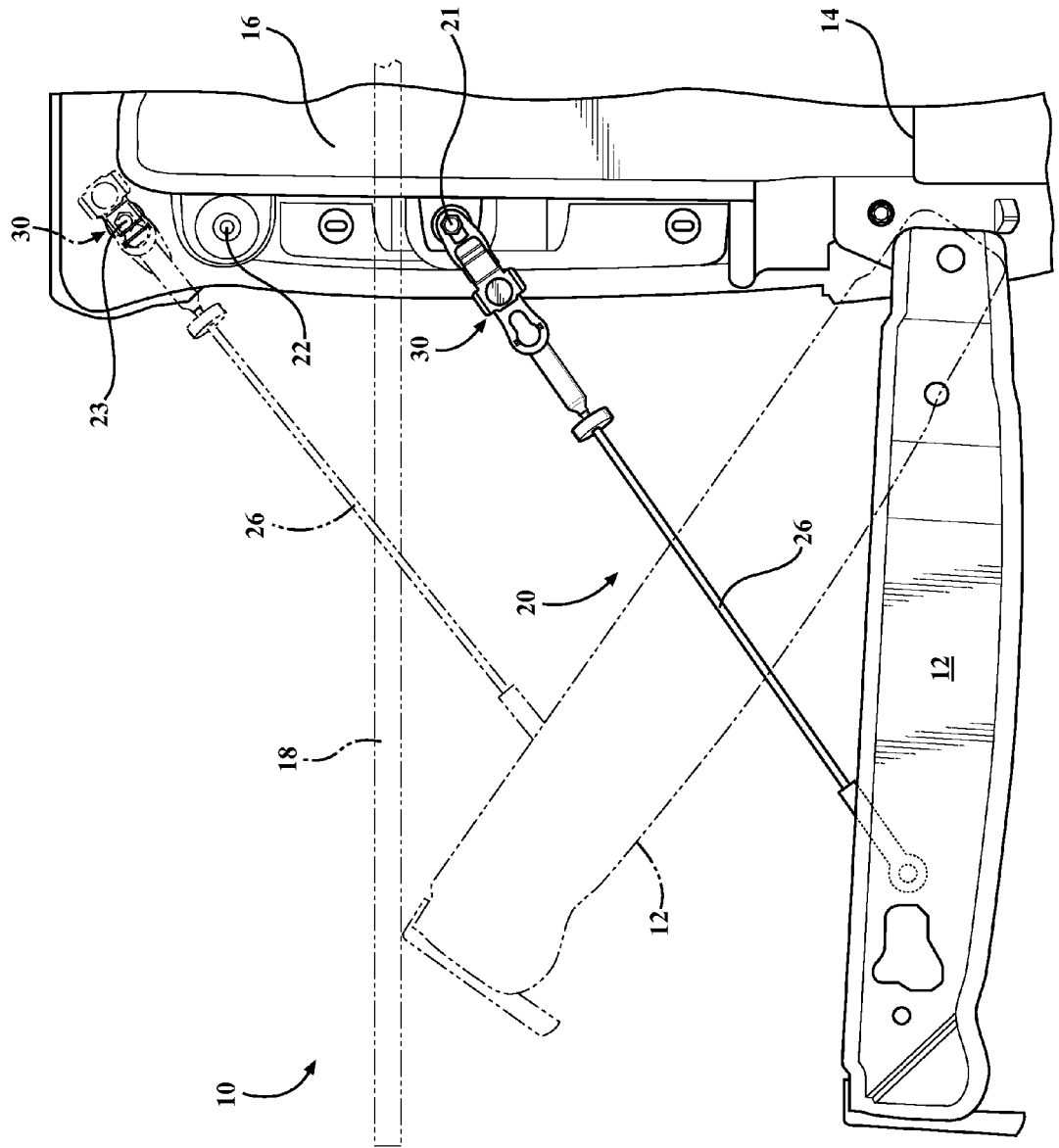
FIG. 1 is a schematic, side view of an endgate system with an endgate illustrated in a fully open position and, in phantom, in one of a plurality of partially deployed positions.

Referring to the drawings, like reference numbers correspond to like or similar components wherever possible throughout the several figures. FIG. 1 shows a schematic side or plan view of a multi-position endgate system 10 with an endgate 12 in a fully open or fully deployed position. FIG. 1 also shows, in phantom, the endgate 12 in one of a plurality of partially deployed positions.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

In the endgate system 10, the endgate 12 is pivotally mounted relative to a storage box floor 14, which may be referred to as the floor 14. A storage box wall 16 is generally perpendicular to the floor 14. The endgate 12, floor 14, and wall 16 collectively define a cargo area or cargo box of a vehicle (the remainder of which is not shown). The specific structure to which the endgate 12 is attached may vary depending upon the configuration and type of vehicle—some may attach the endgate 12 to the walls 16 and some to the floor 14—such that the endgate 12 may be referred to as being attached to the cargo box in general. The endgate 12 may also be referred to as a tailgate.

FIG. 1 shows the endgate 12 in the fully open position, which is substantially horizontal relative to the floor 14 (and, likely, the ground). In a closed position, not shown, the endgate 12 is substantially vertical and abuts the wall 16 to close off the cargo box of the vehicle.

The vehicle (partially shown) upon which the endgate system 10 is mounted may be, for example and without limitation: a pickup truck, a wagon, a cross-over, or a sport-utility vehicle (SUV). When used on wagons, cross-over vehicles, or sport utility vehicles, the endgate 12 may cooperate with a door, hatch, or other structure that opens upward.

The endgate 12 is shown in phantom in one of its partially deployed positions. A platform 18, also shown in phantom, may be placed on top of the endgate 12, such that the platform 18 forms a work surface. This platform can also form a level surface for loading sheet cargo such as plywood or drywall. The platform 18 may be a plywood board or metal sheet.

A cable mechanism 20 spans between the endgate 12 and the wall 16. The cable mechanism 20 is selectively attached to, for example and without limitation: a first anchor point 21, a second anchor point 22, or a third anchor point 23.

The first anchor point 21, the second anchor point 22, and the third anchor point 23 may collectively be referred to as one or more anchor points 24, or any one may be generically referred to as an anchor point 24. The figures illustrate three anchor points 24. However, additional anchor points 24 may be formed on the wall 16. Note that in many configurations, an opposing wall 16 will have similar anchor points 24.

The figures illustrate how the cable mechanism 20 and the anchor points 24 cooperate to allow the endgate 12 to be placed into numerous, different, deployed positions. Each of the different deployed positions sets the endgate 12 at a different angle relative to the floor 14. The cable mechanism 20 and the endgate 12 are capable of carrying substantial loads at each of the deployed positions.

The anchor points 24 are fixedly attached to the wall 16 and may be bosses extending from the wall 16 or bolts attached to the wall 16. In the example shown in the figures, the first anchor point 21 is a bolt, which may be the default or pre-set position for attachment of the cable mechanism 20. The second anchor point 22 illustrated in the figures is a striker, which may also serve to lock the endgate 12 to the wall 16 when the endgate 12 is closed.

The endgate 12 is moveable between its closed position proximal to the wall 16 and a plurality of open or deployed positions distal to the storage box wall 16. As described herein, the cable mechanism 20 is configured to be adjustable between at least two different effective lengths. The effective length of the cable mechanism 20, and the anchor point 24 to which the cable mechanism 20 is attached, collectively determine the open positions of the endgate 12.

As viewed in the solid lines of FIG. 1, the cable mechanism 20 is in its primary, full-length, position and is attached to the first anchor point 21. The solid-line configuration shown in FIG. 1 allows the endgate 12 to be fully deployed to an angle of about one hundred and eighty degrees relative to the floor 14 (or about ninety degrees relative to the wall 16).

As illustrated by the phantom lines of FIG. 1, the cable mechanism 20 is in a secondary, reduced-length, position and is attached to the third anchor point 23. The phantom-line configuration shown in FIG. 1 allows the endgate 12 to be partially deployed to an angle of about forty-five degrees relative to the wall 16. The effective length of the cable mechanism 20 in the secondary position (phantom lines) is less than the effective length of the cable mechanism 20 in the primary position (solid lines).

Figure 2A:
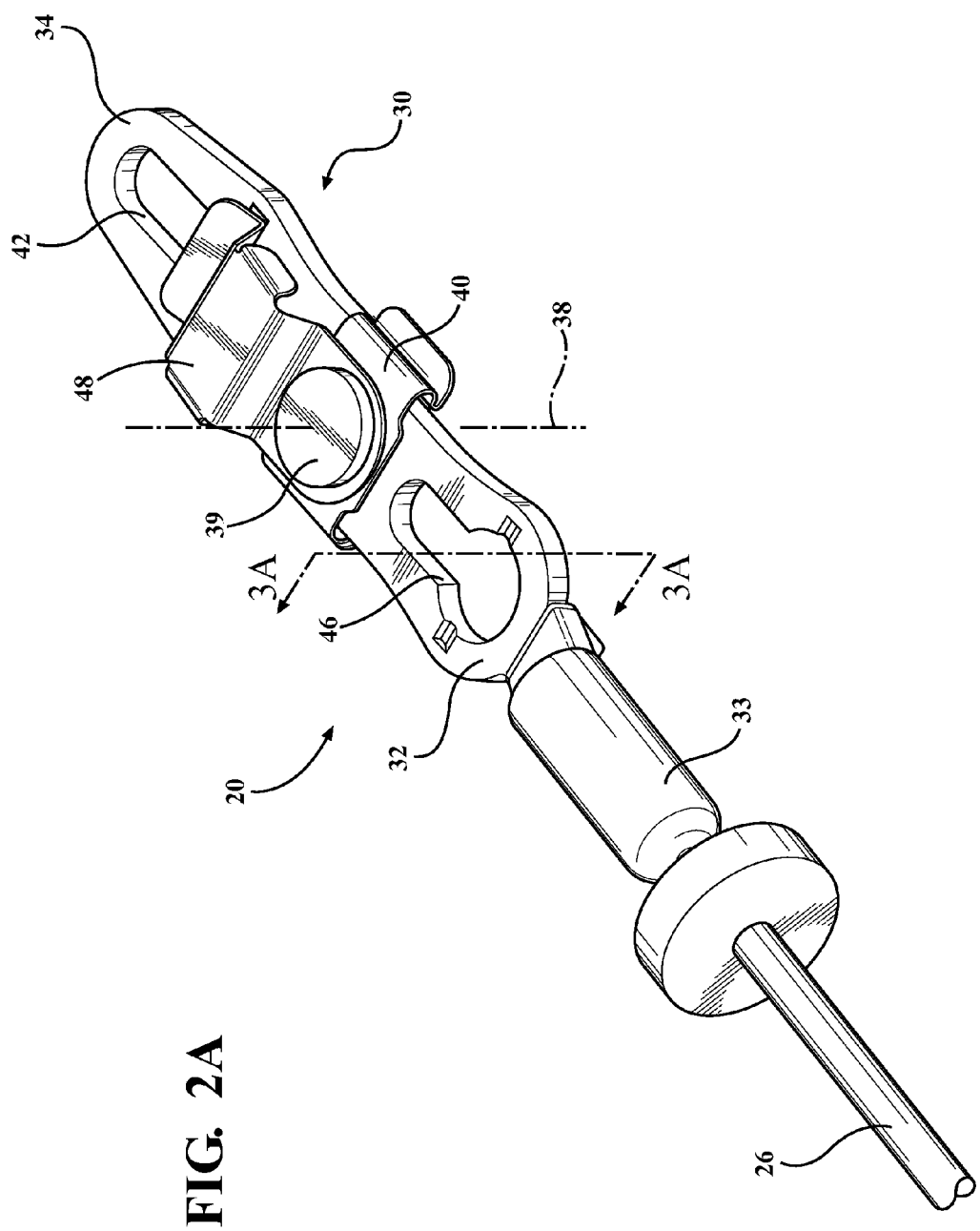
FIG. 2A is a schematic, isometric view of a cable mechanism having an end piece in a primary position, similar to that shown in FIG. 1.
Figure 2B:
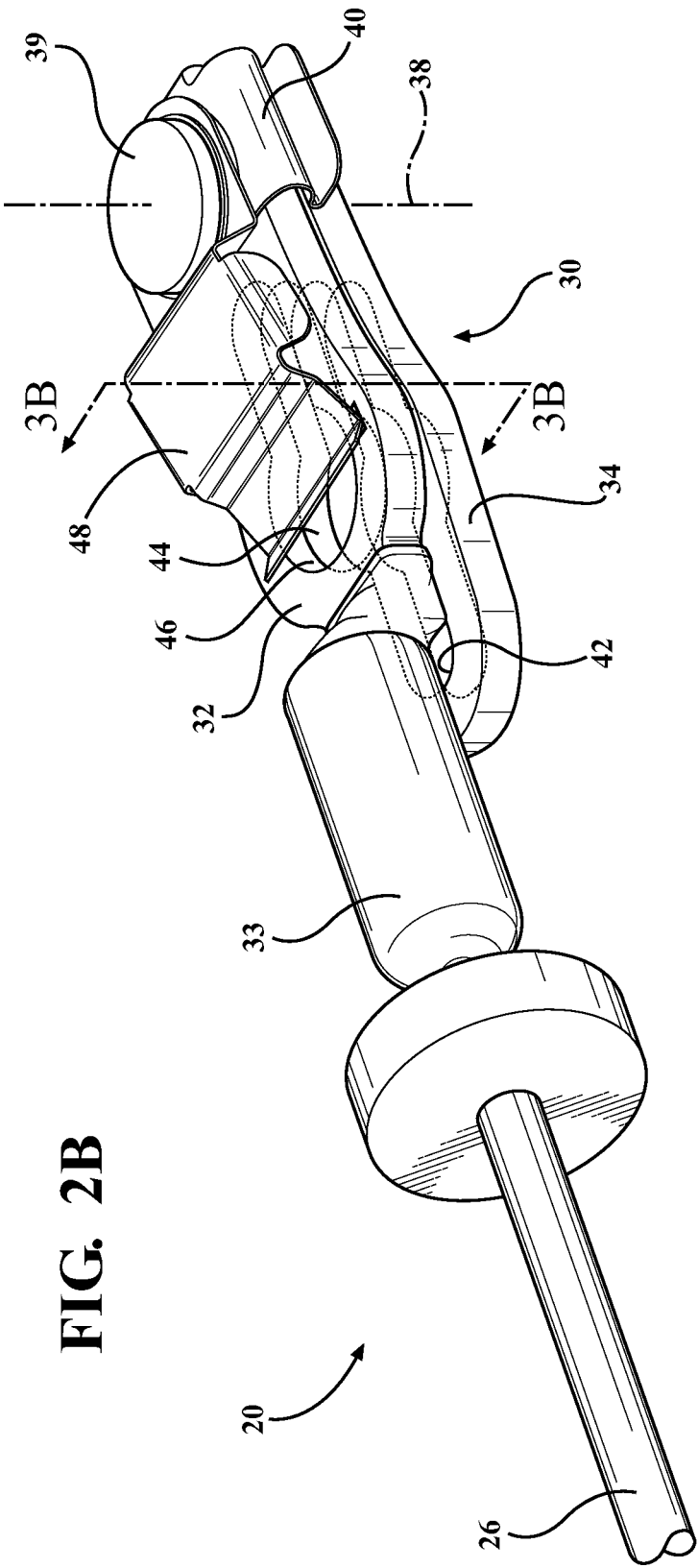
FIG. 2B is a schematic, isometric view of the cable mechanism and the end piece in a secondary position, similar to that shown in phantom in FIG. 1.

Referring also to FIG. 2A and FIG. 2B, and with continued reference to FIG. 1, there are shown additional views of portions of the cable mechanism 20. FIG. 2A shows the cable mechanism 20 in its primary position and FIG. 2B shows the cable mechanism 20 in its secondary position.

The cable mechanism 20 includes a cable 26 and an end piece 30. The cable 26 is pivotally attached at one end to the endgate 12 and at the other end to the end piece 20. The cable 26 may be a wire or a rope, and may be formed from, for example and without limitation: stranded metal, plastic, or natural or synthetic fibers (such as aramid fibers).

The end piece 30 selectively attaches the cable 26 to one of the anchor points 24 on the wall 16. The end piece 30 provides adjustment between the primary position and the secondary position of the cable mechanism 20, and therefore establishes the resulting primary effective length and secondary effective length.

The end piece 30 includes a fixed link 32 attached to the cable 26. The fixed link 32 may be attached to the cable 26 with a crimp 33 or another fastener. A rotating link 34 is operatively attached to the fixed link 32 and is rotatable about a pivot point, such as an axis 38. The rotating link 34 pivots, relative to the fixed link 32, between a first position and a second position.

The first position is shown in FIG. 2A and places the cable mechanism 20 into the primary position. The second position of the rotating link 34 is shown in FIG. 2B and places the cable mechanism 20 into the secondary position. In the second position, the rotating link 34 is nearer (i.e., more proximal) to the cable 26 than in the first position. In some configurations, the rotating link 34 may have additional (third, fourth, et cetera) positions.

In the configuration of the end piece 30 shown, the pivot point is a rivet 39, which pivotally mates the components of the end piece 30 and allows rotation about the axis 38. The pivot point may also be, for example and without limitation: a bolt and nut, partition bolt, or binding bolt. The rivet 39 may or may not be combined with one or more bushings to allow smooth rotation.

The axis 38 is substantially perpendicular to the cable 26, such that the rotating link 34 is not spinning on the cable 26 or on an axis parallel to the cable 26. Therefore, the effective length of the cable mechanism 20 changes between the first position and second position of the rotating link 34.

The end piece 30 includes an anti-rotation clip 40, which is configured to selectively prevent rotation of the rotating link 34 relative to the fixed link 32. The anti-rotation clip 40 prevents rotation when the rotating link 34 is substantially in the first position or in the second position, but allows rotation when the rotating link 34 is between the first position and the second position. Therefore, the end piece 30 is held in the primary position or the secondary position until the anti-rotation clip 40 is flexed (such as by an operator of the vehicle) to allow the rotating link 34 to move out of either the first position or the second position.

As shown in FIG. 2A and FIG. 2B, the second position of the rotating link 34 is offset from the first position by substantially 180-degress of rotation about the axis 38. Therefore, the anti-rotation clip 40 prevents the end piece 30 from locking unless the rotating link 34 is at either zero degrees or one hundred and eighty degrees relative to the fixed link 32.

Referring also to FIG. 3A and FIG. 3B, and with continued reference to FIGS. 1-2B, there are shown additional views of portions of the cable mechanism 20. FIG. 3A shows a partial cross-sectional view of the cable mechanism 20 taken substantially along line 3A-3A of FIG. 2A, and FIG. 3B shows a similar view taken substantially along line 3B-3B of FIG. 2B. Some of the components of FIGS. 3A and 3B may not be sectioned or may be shown as plane intersections (showing only edges without hatching).

A primary keyway 42 is formed in the rotating link 34 and is configured to selectively mate with one of the anchor points 24. The primary keyway 42 is used only when the rotating link 34 is in the first position. A secondary keyway 44 is also formed in the rotating link 34 and is configured to selectively mate with one of the anchor points 24, but only when the rotating link 34 is in the second position.

Both the primary keyway 42 and the secondary keyway 44 allow the anchor point 24, which may be a bolt, to enter through a keyhole (not numbered) and then restrain the anchor point 24 in a slot (not numbered). In the configuration shown in FIGS. 2A-3B, the primary keyway 42 and the secondary keyway 44 share a keyhole but have separate slots. The slot of the primary keyway 42 faces in the opposite direction from the slot of the secondary keyway 44 relative to the respective keyholes, such that the rotating link 34 needs to pivot for the anchor point 24 to be retained within the respective slots.

The end piece 30 also includes an overlapping keyway 46 formed in the fixed link 32. When the rotating link 34 is in the second position, the overlapping keyway 46 is substantially aligned with the secondary keyway 44. The overlapping keyway 46 is configured to selectively mate with the boss when the rotating link 34 is in the second position.

The secondary keyway 44 and the overlapping keyway 46 allow the cable mechanism 20 to be placed into the secondary position without the end piece 30 extending substantially beyond the anchor point 24 to which it is attached. For example, if the end piece 30 were not placed into the secondary position and only the overlapping keyway 46 were attached to the anchor point 24, the rotating link 34 would extend beyond the anchor point 24, which could result in contact between the end piece 30 and portions of the wall 16 that extend further into the cargo space.

In the secondary position, the axis 38 and the rivet 39 are on the opposing side of the anchor point 24 from the cable 26. However, because of the pivoting or folding action of the rotating link 34 relative to the fixed link 32, the end piece 30 does not extend substantially beyond the anchor point 24 and does not contact the wall 16.

The end piece 30 also includes a retention clip 48, which is configured to selectively resist, and ideally prevent, separation of the anchor point 24 from either the primary keyway 42 or the secondary keyway 44. When the endgate 12 is deployed, the cable mechanism 20 is placed into tension and the anchor point 24 is held in the slot of the primary keyway 42 or the secondary keyway 44. However, the retention clip 48 further restricts movement of the end piece 30 relative to the anchor point 24 by restricting movement from the slot to the keyhole, at which point the anchor point 24 could separate from the end piece 30.

When the end piece 30 is in the primary position, as shown in FIGS. 2A and 3A, the operator can overcome the restriction of the retention clip 48 by flexing the retention clip 48 away from the rotating link 34. Similarly, when the end piece 30 is in the secondary position, as shown in FIGS. 2B and 3B, the operator can overcome the restriction by flexing the retention clip 48 away from the fixed link 32.

Once the restriction of the retention clip 48 is removed, the end piece 30 can be separated from the anchor point 24 to which it is attached. The end piece 30 can then be adjusted between the primary position and the secondary position, moved to another anchor point 24, or both, such that the deployed position of the endgate 12 may be adjusted.

The retention clip 48 pivots substantially synchronously with the rotatable link 34. Tracking between the retention clip 48 and the rotatable link 34 may occur through features in the rivet 39. For example, and without limitation: the retention clip 48 and the rotatable link 34 may be pressed onto the rivet 39 but the fixed link 32 may have a slip fit; or the rivet 39 may be mated to the rotatable link 34 and the retention clip 48 through a grooved, splined, geared, or shoulder-keyed feature.

Figure 4:
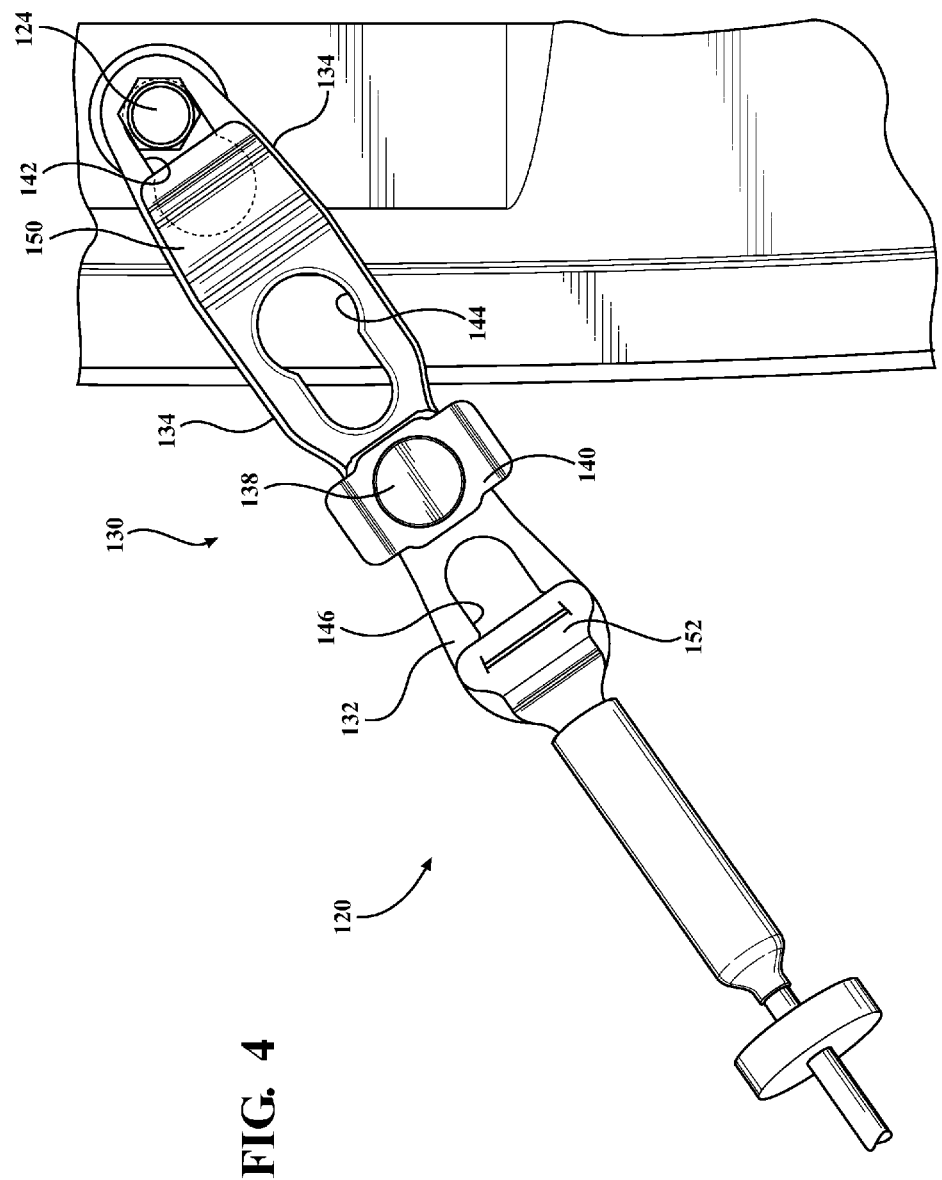
FIG. 4 is a schematic, isometric view of a cable mechanism having an end piece with two retention clips in a primary position.

Referring now to FIG. 4, and with continued reference to FIGS. 1-3B, there is shown an alternative, but similar, cable mechanism 120 having an end piece 130. The end piece 130 is shown in a primary position, such that the cable mechanism 120 has its full effective length, but the end piece 130 is also rotatable into a secondary position, such that the cable mechanism 120 has a shortened effective length. Components that are, or may be, substantially identical between the cable mechanism 20 of FIGS. 1-3B and the cable mechanism 120 of FIG. 4 may not be separately identified or described in detail with reference to FIG. 4.

The cable mechanism 120 includes a cable (not numbered) attached to the end piece 130. The end piece 130 includes a fixed link 132 and a rotating link 134 that is operatively attached to the fixed link 132 and is rotatable about a pivot point 138.

The rotating link 134 pivots, relative to the fixed link 132, between a first position, as shown in FIG. 4, and a second position, which is not shown but is similar to the second positions shown in FIGS. 2B and 3B. The pivot point 138 is substantially perpendicular to the cable, such that the effective length of the cable mechanism 120 changes between the first position and second position of the rotating link 134.

The end piece 130 includes an anti-rotation clip 140, which is configured to selectively prevent rotation of the rotating link 134 relative to the fixed link 132. A primary keyway 142 is formed in the rotating link 134 and is configured to selectively mate with one of the anchor points 124 when the rotating link 134 is in the first position. The primary keyway 142 is partially hidden from view in FIG. 4 and hidden portions are illustrated with dashed or phantom lines. A secondary keyway 144 is also formed in the rotating link 134 and is configured to selectively mate with one of the anchor points 124 when the rotating link 134 is in the second position.

Note that the primary keyway 142 and the secondary keyway 144 are completely separate on the end piece 130 and share neither a keyhole, through which the anchor point 124 enters, nor a slot, in which the anchor point 124 sits while the end piece 130 is attached. The slots of the primary keyway 142 and the secondary keyway 144 face or extend in opposing directions relative to their respective keyholes.

The end piece 130 also includes an overlapping keyway 146 formed in the fixed link 132. When the rotating link 134 is in the second position, the overlapping keyway 146 is substantially aligned with the secondary keyway 144.

The end piece 30 shown in FIGS. 1-3B includes only the retention clip 48, which provides retention for both the primary and secondary positions. However, the end piece 130 shown in FIG. 4 includes both a primary retention clip 150 and a secondary retention clip 152.

The primary retention clip 150 is aligned, and moves, with the rotating link 134 and is configured to resist separation of anchor point 124 from only the primary keyway 142. The secondary retention clip 152 is aligned with the fixed link 132 and does not move. The secondary retention clip 152 is configured to resist separation of the anchor point 124 from the secondary keyway 144 and the overlapping keyway 146.

To allow the end piece 130 to be removed from the anchor point 124 while the cable mechanism 120 is in the primary position, the primary retention clip 150 is flexed away from the primary keyway 142. To allow the end piece 130 to be removed from the anchor point 124 while the cable mechanism 120 is in the secondary position, the secondary retention clip 152 is flexed away from the secondary keyway 144 and the overlapping keyway 146.

In the secondary position, the pivot point 138 is on the opposing side of the anchor point 124 from the cable and the secondary keyway 144. However, because of the pivoting or folding action of the rotating link 134 relative to the fixed link 132, the end piece 130 does not extend substantially beyond the anchor point 124 and does not contact portions of the wall beyond the anchor point 124.

Figure 5:
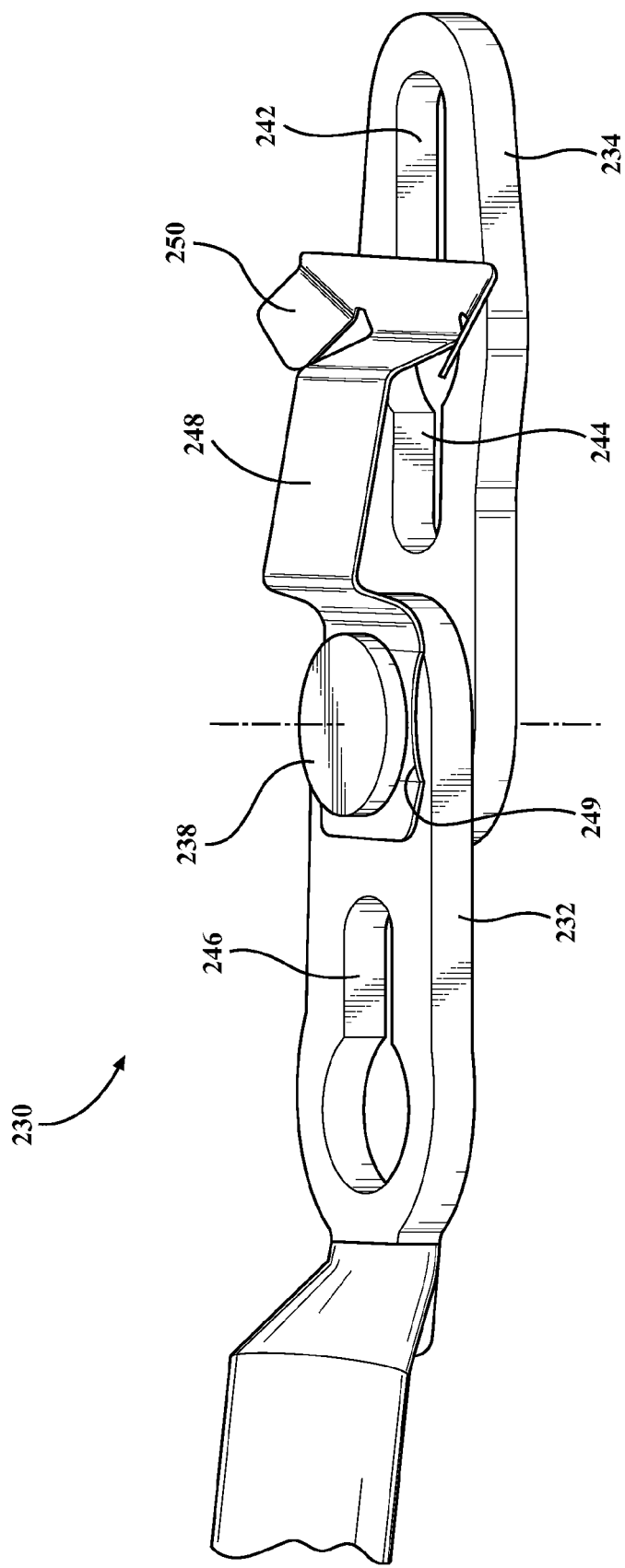
FIG. 5 is a schematic, isometric view of a cable mechanism having an end piece with a combined clip in a primary position.

Referring now to FIG. 5, and with continued reference to FIGS. 1-4, there is shown an end piece 230 for a cable mechanism (not numbered). The end piece 230 is shown in a primary position, such that the cable mechanism has its full effective length, but the end piece 230 is also rotatable into a secondary position, such that the cable mechanism has a shortened effective length. Components that are, or may be, substantially similar to previously described components may not be separately identified or described.

The end piece 230 attaches a cable (not shown) to a cargo compartment (not shown), similar to the other configurations.

The end piece 230 includes a fixed link 232 and a rotating link 234 that is operatively attached to the fixed link 232 and is rotatable about a pivot point 238.

The rotating link 234 pivots, relative to the fixed link 232, between a first position, as shown in FIG. 5, and a second position, which is not shown but is similar to the second positions shown in FIGS. 2B and 3B. The pivot point 238 is substantially perpendicular to the cable, such that the effective length of the cable mechanism changes, by shortening, between the first position and second position of the rotating link 234.

A primary keyway 242 is formed in the rotating link 234 and is configured to selectively mate with one or more anchor points (not shown) when the rotating link 234 is in the first position. A secondary keyway 244 is also formed in the rotating link 234 and is configured to selectively mate with one of the anchor points when the rotating link 234 is in the second position.

Note that the primary keyway 242 and the secondary keyway 244 share a common keyhole, through which the anchor point enters. The slots of the primary keyway 242 and the secondary keyway 244 face or extend in opposing directions relative to their respective keyholes.

The end piece 230 also includes an overlapping keyway 246 formed in the fixed link 232. When the rotating link 234 is in the second position, the overlapping keyway 246 is substantially aligned with the secondary keyway 244, such that the overlapping keyway 246 and the secondary keyway 244 cooperate to hold the anchor point to which the end piece 230 is attached in the second position.

The end piece 230 also uses a combined clip 248 to provide retention and anti-rotation functions. The combined clip 248 rotates with the rotating link 234, such that the combined clip 248 retains the anchor points when the end piece 230 is in both the primary and secondary positions. The combined clip 248 also limits rotation of the rotating link 234 by applying force at the pivot point 238, such as through a wave-shaped spring element 229.

In order to help the operator overcome the force applied by the combined clip 248, the one or more wing tabs 250 are formed at the retention portion of the combined clip 248. By lifting the wing tabs 250, the operator removes the combined clip 248 from either the primary keyway 242 or the secondary keyway 244, allowing the end piece 230 to be removed from the anchor to which it is attached. Furthermore, lifting the wing tabs 250 removes the bias force applied by the wave-shaped spring element 229 between the pivot point 238 and the fixed link 232, allowing rotation of the rotating link 234, such that the end piece 230 may be placed into its second (shortened) position.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. An end piece for attaching a cable to a boss, the end piece comprising:
   a fixed link attached to the cable;
   a rotating link operatively attached to the fixed link and rotatable about a pivot point between a first position and a second position relative to the fixed link, wherein the second position of the rotating link is more proximal to the cable than the first position of the rotating link;
   a primary keyway formed in the rotating link and configured to selectively mate with the boss when the rotating link is in the first position; and
   a secondary keyway formed in the rotating link and configured to selectively mate with the boss when the rotating link is in the second position.

2. The end piece of claim 1, further comprising:
   a retention clip configured to resist separation of the boss from one of the primary keyway and the secondary keyway.

3. The end piece of claim 2, further comprising:
   an overlapping keyway formed in the fixed link and substantially aligned with the secondary keyway when the rotating link is in the second position and configured to selectively mate with the boss when the rotating link is in the second position.

4. The end piece of claim 3, further comprising:
   an anti-rotation clip configured to prevent rotation when the rotating link is in the first position or in the second position but to allow rotation when the rotating link is between the first position and the second position.

5. The end piece of claim 4, wherein the retention clip is a primary retention clip configured to resist separation of the boss from the primary keyway, and further comprising:
   a secondary retention clip configured to resist separation of the boss from the secondary keyway.

6. The end piece of claim 5, wherein the second position of the rotating link is offset from the first position by substantially 180-degress of rotation about the pivot point.

7. The end piece of claim 2, wherein the retention clip rotates about the pivot point substantially synchronously with the rotating link.

8. The end piece of claim 2, wherein the pivot point is beyond the boss, relative to the cable, when the rotating link is in the second position.

9. The end piece of claim 2, wherein the primary keyway and the secondary keyway face in opposite directions, such that the rotating link must rotate for the secondary keyway to engage the boss.

10. The end piece of claim 4, wherein the retention clip and the anti-rotation clip are part of a combined clip, which is formed as a single component.

11. The end piece of claim 10, wherein the combined clip rotates about the pivot point substantially synchronously with the rotating link, such that the combined clip resists separation of the boss from the primary keyway and from the secondary keyway.

12. A multi-position endgate system, comprising:
   a storage box wall;
   a storage box floor;
   a first anchor point fixedly attached to the storage box wall;
   a second anchor point fixedly attached to the storage box wall;
   a cable mechanism;
      a cable pivotally attached to the endgate;
      a fixed link attached to the cable;
      a rotating link operatively attached to the fixed link and rotatable about an axis between a primary position and a secondary position relative to the fixed link, wherein the cable mechanism has a primary effective length when the rotating link is in the primary position and has a secondary effective length, which is shorter than the primary effective length, when the rotating link is in the secondary position of the cable mechanism;
      a primary keyway formed in the rotating link and configured to selectively mate with one of the first anchor point and the second anchor point when the rotating link is in the primary position; and a secondary keyway formed in the rotating link and configured to selectively mate with one of the first anchor point and the second anchor point when the rotating link is in the secondary position; and an endgate pivotally mounted relative to the storage box floor, wherein the endgate is moveable between a closed position proximal to the storage box wall and a plurality of open positions distal to the storage box wall.

13. The endgate system of claim 12, wherein the cable mechanism further includes:

a retention clip configured to resist separation of one of the first anchor point and the second anchor point from one of the primary keyway and the secondary keyway.

14. The endgate system of claim 13, wherein the axis of the cable mechanism is beyond the anchor point, relative to the cable, when the rotating link is in the second position.

\* \* \* \* \*